US010055076B2

United States Patent
Nakayama

(10) Patent No.: US 10,055,076 B2
(45) Date of Patent: Aug. 21, 2018

(54) CONDUCTIVE SHEET FOR TOUCH PANEL AND CAPACITIVE TOUCH PANEL

(71) Applicant: FUJIFILM Corporation, Tokyo (JP)

(72) Inventor: Masaya Nakayama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 182 days.

(21) Appl. No.: 15/271,371

(22) Filed: Sep. 21, 2016

(65) Prior Publication Data

US 2017/0010720 A1 Jan. 12, 2017

Related U.S. Application Data

(63) Continuation of application No. PCT/JP2015/056787, filed on Mar. 9, 2015.

(30) Foreign Application Priority Data

May 16, 2014 (JP) .................................. 2014-102833

(51) Int. Cl.
*G06F 3/045* (2006.01)
*G06F 3/044* (2006.01)

(52) U.S. Cl.
CPC .... *G06F 3/044* (2013.01); *G06F 2203/04103* (2013.01); *G06F 2203/04111* (2013.01); *G06F 2203/04112* (2013.01)

(58) Field of Classification Search
CPC ...... G06F 3/044; G06F 3/0412; G06F 3/0416; G06F 2203/04103; G06F 2203/04111; G06F 2203/04112
See application file for complete search history.

(56) References Cited

U.S. PATENT DOCUMENTS 9,195,108 B2 * 11/2015 Park .................. G02F 1/136286
9,295,176 B2 * 3/2016 Ohtani .................... G06F 3/041
(Continued)

FOREIGN PATENT DOCUMENTS

| JP | 2012-103761 A | 5/2012 |
| JP | 2012-185813 A | 9/2012 |

(Continued)

OTHER PUBLICATIONS

Communication dated Oct. 31, 2017 from the Japanese Patent Office in counterpart Application No. 2016-519140.
(Continued)

*Primary Examiner* — Vijay Shankar
(74) *Attorney, Agent, or Firm* — Sughrue Mion, PLLC

(57) ABSTRACT

In a second-conductive-sheet for a touch-panel, a plurality of upper-detection-electrodes disposed in a detection region and a plurality of second terminal wiring portions disposed in a peripheral wiring region to electrically connect the upper-detection-electrodes to second terminal portions and are formed. Each of the upper-detection-electrodes is made of a mesh-patterned first metal mesh having intersecting thin conductive metal wires, and each of the second terminal wiring portions is made of a mesh-patterned second metal mesh having intersecting thin conductive metal wires made of the same material as the thin conductive metal wires constituting each of the upper detection electrodes. The wire width of the first metal mesh is set to be equal to or less than 5 μm, and the extension direction of the thin conductive metal wires constituting the first metal mesh and the second metal mesh is inclined with respect to a bending line direction of a bent portion of a second-resin-film.

20 Claims, 10 Drawing Sheets

(56) References Cited

U.S. PATENT DOCUMENTS

| | | | |
|---|---|---|---|
| 9,541,785 B2* | 1/2017 | Iwami | G06F 3/044 |
| 2011/0086680 A1* | 4/2011 | Kim | G06F 1/1626 |
| | | | 455/574 |
| 2011/0227846 A1* | 9/2011 | Imazeki | G06F 3/044 |
| | | | 345/173 |
| 2012/0062447 A1* | 3/2012 | Tseng | G02F 1/133305 |
| | | | 345/33 |
| 2012/0127087 A1* | 5/2012 | Ma | G06F 1/1616 |
| | | | 345/173 |
| 2013/0242485 A1 | 9/2013 | Ohtani et al. | |
| 2013/0335375 A1 | 12/2013 | Nishikawa et al. | |
| 2014/0054070 A1 | 2/2014 | Ichiki | |
| 2014/0055702 A1 | 2/2014 | Park et al. | |
| 2014/0076612 A1 | 3/2014 | Kuriki | |
| 2014/0218642 A1 | 8/2014 | Iwami | |

FOREIGN PATENT DOCUMENTS

| | | |
|---|---|---|
| JP | 2012-238278 A | 12/2012 |
| JP | 2012-242871 A | 12/2012 |
| JP | 2013-025626 A | 2/2013 |
| JP | 2013-080425 A | 5/2013 |
| JP | 2013-084639 A | 5/2013 |
| JP | 2014-26510 A | 2/2014 |
| JP | 2014-056461 A | 3/2014 |
| WO | 2012/132846 A1 | 4/2012 |

OTHER PUBLICATIONS

International Preliminary Report on Patentability, dated Oct. 21, 2016, issued in International Application No. PCT/JP2015/056787, 18 pages in English and Japanese.

Communication dated May 2, 2017 issued by the Japanese Patent Office in counterpart Japanese application No. 2016-519140.

International Search Report for PCT/JP2015/056787 dated May 26, 2015.

* cited by examiner

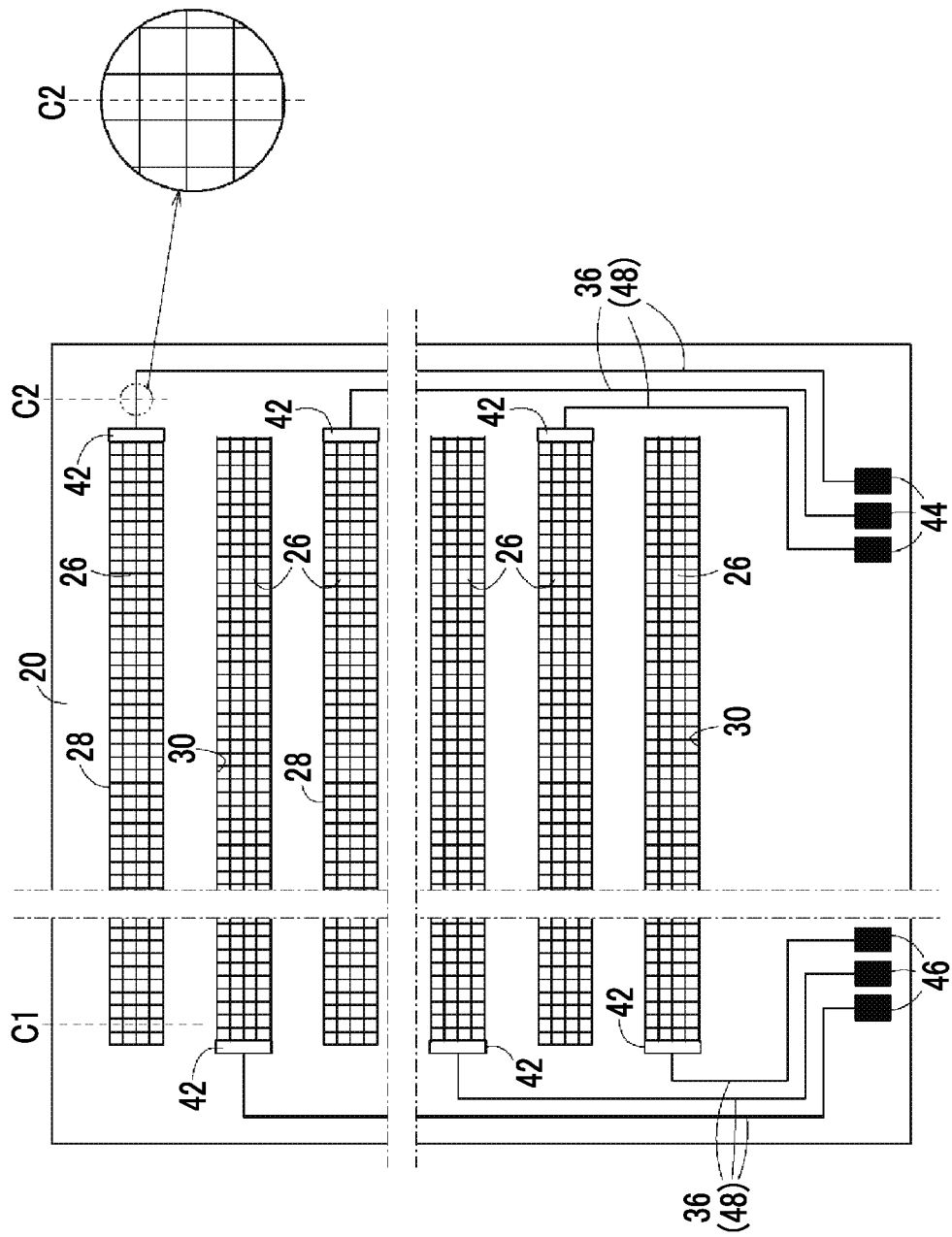

CONDUCTIVE SHEET FOR TOUCH PANEL AND CAPACITIVE TOUCH PANEL

CROSS-REFERENCE TO RELATED APPLICATIONS

This application is a Continuation of PCT International Application No. PCT/JP2015/056787 Filed on Mar. 9, 2015, which claims priority under 35 U.S.C § 119 (a) to Japanese Patent Application No. 2014-102833 filed on May 16, 2014. Each of the above application(s) is hereby expressly incorporated by reference, in its entirety, into the present application.

BACKGROUND OF THE INVENTION

1. Field of the Invention

The present invention relates to a conductive sheet for a touch panel which has a resin film, on which a plurality of detection electrodes and a plurality of peripheral wirings electrically connecting the detection electrodes to terminal portions are formed, and having a three-dimensional shape, and a capacitive touch panel.

2. Description of the Related Art

As a display device for a multi-function mobile phone (smartphone), a digital camera, or a personal computer, a so-called touch panel on which various operations are performed by a touch with a finger has been widely used. In the related art, while this kind of touch panel has spread as a so-called two-dimensional body having a planar operation surface, recently, a three-dimensional (stereoscopic) body represented by a body in which side surfaces are provided by bending end portions of an operation surface and operations on the side surfaces are enabled has been suggested. For example, JP2012-242871A (in particular, see FIG. 2) discloses a touch panel in which an operation surface is curved.

The touch panel has a resin film on which detection electrodes and peripheral wirings electrically connecting the detection electrodes to terminal portions are formed. In order to obtain a three-dimensional body, the resin film needs to be bent; however, at this time, as described in WO2012/132846A (in particular, see FIG. 1), for example, the peripheral wirings are bent along with the resin film.

SUMMARY OF THE INVENTION

In a case where a touch panel is experimentally manufactured by performing three-dimensional molding on a resin film, disconnection may occur in the detection electrodes or the peripheral wirings. Disconnected parts are primarily observed in a bent portion of the detection electrodes or the peripheral wirings, but are observed in other portions.

The inventors have studied causes for disconnection and have found that disconnection is caused by heating at the time of three-dimensional molding. That is, the knowledge that disconnection occurs because the resin film locally extends due to heating has been obtained.

The local extension of the resin film occurs in a random portion, not in a specific portion, such as a bent portion. For this reason, it is not easy to prevent the local extension, and thus, it is also not easy to avoid disconnection.

The invention has been accomplished in order to solve the above-described problems, and an object of the invention is to provide a conductive sheet for a touch panel in which disconnection is suppressed while having a resin film subjected to three-dimensional molding, and a capacitive touch panel.

The above-described object is attained by the configuration of [1] described below.

[1] A conductive sheet for a touch panel comprises a resin film on which a plurality of detection electrodes disposed in a detection region and a plurality of peripheral wirings disposed in a peripheral wiring region to electrically connect the detection electrodes to terminal portions are formed, the resin film having a three-dimensional shape having a bent portion. Each of the detection electrodes is made of a mesh-patterned first metal mesh having intersecting thin conductive metal wires. Each of the peripheral wirings is made of a mesh-patterned second metal mesh having intersecting thin conductive metal wires made of the same material as the thin conductive metal wires constituting each of the detection electrodes. The wire width of the first metal mesh is equal to or less than 5 μm, and the extension direction of the thin conductive metal wires constituting the first metal mesh and the second metal mesh is inclined with respect to a bending line direction of the bent portion of the resin film.

Here, the three-dimensional shape refers to a stereoscopic shape in which the resin film has a bent portion, and for this reason, the operation surface has a three-dimensional shape not a two-dimensional shape. Bending may be gentle curving, or may be sharp folding. The term "inclined" means a case other than a case where the extension direction is parallel or perpendicular to the bending line direction.

In the invention, both of the detection electrodes and the peripheral wiring are made of the mesh constituting the thin conductive metal wires. The mesh has excellent followability when the resin film is extended. For this reason, the mesh extends to follow the extension locally occurring in the bent portion or other portions at the time of three-dimensional molding (bending). Furthermore, since the peripheral wirings and the detection electrodes are constituted of the metal wires made of the same material, it is possible to form the boundary between the peripheral wirings and the detection electrodes seamlessly. Therefore, it is possible to prevent disconnection in the seams at the time of three-dimensional molding (bending).

Accordingly, it is possible to prevent disconnection of the detection electrodes and the peripheral wirings and an increase in resistance due to disconnection. In addition, the wire width of the first metal mesh constituting the detection electrodes is equal to or less than 5 μm. Furthermore, the extension direction of the thin conductive metal wires and the bending line direction intersect at a predetermined angle, not being parallel or perpendicular to each other, in both of the detection electrodes and the peripheral wirings. For this reason, disconnection hardly occurs compared to a case where the extension direction is parallel or perpendicular to the bending line direction. That is, it is possible to further suppress the occurrence of disconnection. For this reason, it is possible to constitute a three-dimensional touch panel having excellent detection sensitivity and excellent visibility.

[2] It is preferable that the resin film has the bent portion in a region including at least one of the detection electrode or the peripheral wirings.

According to the configuration of [1] described above in which the detection electrodes and the peripheral wirings are formed of the mesh, disconnection is suppressed. Accordingly, even in a case where the resin film including the detection electrodes or the peripheral wirings is bent, it is possible to avoid disconnection of the detection electrodes or the peripheral wirings.

[3] It is preferable that the extension direction of the thin conductive metal wires constituting the first metal mesh and the second metal mesh is inclined at an angle of 20° to 70° with respect to the bending line direction of the bent portion of the resin film.

The extension direction of the thin conductive metal wires and the bending line direction intersect at the angle described above, whereby it is possible to further suppress the occurrence of disconnection.

[4] It is preferable that an average mesh pitch of the second metal mesh is smaller than an average mesh pitch of the first metal mesh.

In this case, it is possible to reduce the resistance of the peripheral wirings. As a result, a touch panel has high sensitivity.

[5] It is preferable that the average mesh pitch of the second metal mesh is 10 to 50 μm.

With the average mesh pitch set in this way, it is possible to achieve greater disconnection prevention while achieving reduction in resistance of the peripheral wirings.

[6] It is preferable that the wire width of the first metal mesh is equal to the wire width of the second metal mesh.

In a case where the wire width of the first metal mesh is different from the wire width of the second metal mesh, in particular, if there is a part where the wire width is locally thin, when performing three-dimensional molding on the resin film, stress is likely to intensively occur in the thin part, and thus, disconnection is likely to occur. In order to prevent this phenomenon, it is preferable that the wire width of the first metal mesh is equal to the wire width of the second metal mesh. That is, the wire widths of both meshes are made equal, whereby it is possible to effectively prevent disconnection at the time of three-dimensional molding and to constitute a three-dimensional touch panel having excellent productivity.

[7] It is preferable that a first stress distribution portion which is insulated from both of the detection electrodes and the peripheral wirings and has the same surface density as that of the first metal mesh is provided between at least adjacent detection electrodes in the detection region.

[8] It is preferable that the first stress distribution portion has intersecting thin conductive metal wires made of the same material as the thin conductive metal wires constituting each of the detection electrodes, and is made of a metal mesh having the same mesh shape as that of the first metal mesh.

[9] In addition, it is preferable that a second stress distribution portion which is insulated from both the detection electrodes and the peripheral wirings and has the same surface density as that of the second metal mesh is provided between at leas adjacent peripheral wirings in the peripheral wiring region.

[10] Furthermore, it is preferable that the second stress distribution portion has intersecting thin conductive metal wires made of the same material as the thin conductive metal wires constituting each of the peripheral wirings, and is made of a metal mesh having the same mesh shape as that of the second metal mesh.

In the above, the surface density of the metal mesh indicates the amount of thin conductive metal wires constituting the metal mesh portion per unit area and can be determined based on Expression (1) described above.

$$\text{Surface density} = \alpha \times \text{occupancy of thin conductive metal wires of metal mesh portion} \times \text{film thickness of thin conductive metal wire} \quad (1)$$

Note that $\alpha$ is the volume weight density of the thin conductive metal wires.

The first stress distribution portion or the second stress distribution portion is provided, whereby stress is distributed evenly in the detection region or the peripheral wiring region. For this reason, it is possible to prevent the local extension of the resin film. Therefore, it is possible to further suppress disconnection or an increase in resistance.

[11] It is preferable that a stress relaxation portion in which the thin conductive metal wires constituting each of the detection electrodes are disconnected is formed inside at least one of the detection electrodes.

In this case, if the corresponding resin film inside each of the detection electrodes extends, stress generated at this time is relaxed by the stress relaxation portion. For this reason, the progress of disconnection due to stress is avoided. Therefore, it is possible to further prevent an increase in resistance.

[12] It is preferable that the stress relaxation portion is formed by partially disconnecting the thin conductive metal wires constituting each of the detection electrodes.

[13] It is preferable that the shape of the first metal mesh is a random pattern. The random pattern refers to a pattern in which a plurality of cells forming a mesh electrode are different in shape or size, and for this reason, the periodicity (regularity or uniformity) of the cells is low.

In a mesh electrode having a random pattern in which cells having random shapes, sizes, or the like are linked, the periodicity is low. Therefore, in this case, moire with a pixel pattern of a display device hardly occurs regardless of a viewing angle.

[14] It is preferable that the shape of the second metal mesh is a regular pattern.

[15] It is preferable that the resin film is bent with a surface, on which the detection electrodes and the peripheral wirings are formed, placed inside to have a three-dimensional shape.

When being bent with the surface, on which the detection electrodes and the peripheral wirings are formed, placed inside, the amount of extension of the detection electrodes and the peripheral wirings is reduced compared to when being bent with the surface placed outside. For this reason, disconnection is further suppressed.

[16] The invention provides a capacitive touch panel comprising a conductive sheet for a touch panel configured as above.

According to the invention, both of the detection electrodes and the peripheral wirings provided on the resin film are formed of the mesh having the thin conductive metal wires, the wire width of the first metal mesh constituting each of the detection electrodes is set to be equal to or less than 5 μm, and the extension direction of the thin conductive metal wires is inclined with respect to the bending line direction of the bent portion. The mesh has excellent followability when the resin film is extended. That is, the mesh extends comparatively easily to follow the extension locally occurring in the bent portion or other portions at the time of three-dimensional molding. In addition, since the thin conductive metal wires are not parallel or perpendicular to the bending line direction, it is possible to effectively prevent disconnection in the bent portion.

For this reason, disconnection of the detection electrodes and the peripheral wirings is avoided. Therefore, an increase in resistance due to disconnection is prevented. For this reason, it is possible to prevent a three-dimensional touch panel having excellent detection sensitivity and excellent transmittance and visibility.

BRIEF DESCRIPTION OF THE DRAWINGS

FIG. 14 is a schematic sectional view showing a main part of a capacitive touch panel in which mesh patterns of both of detection electrodes and terminal wiring portions are substantially a square shape.

DESCRIPTION OF THE PREFERRED EMBODIMENTS

Hereinafter, a conductive sheet for a touch panel according to the invention will be described in detail referring to the accompanying drawings in connection with a preferred embodiment in relation to a capacitive touch panel including the conductive sheet for a touch panel.

In this specification, "to" indicating a numerical value range is used as a meaning including numerical values described on the front and rear thereof as a lower limit value and an upper limit value. The term "upper" indicates a side (outside) near a viewer who views a three-dimensional touch panel-equipped display device, and the term "lower" indicates a side (inside) away from the viewer.

Figure 1:
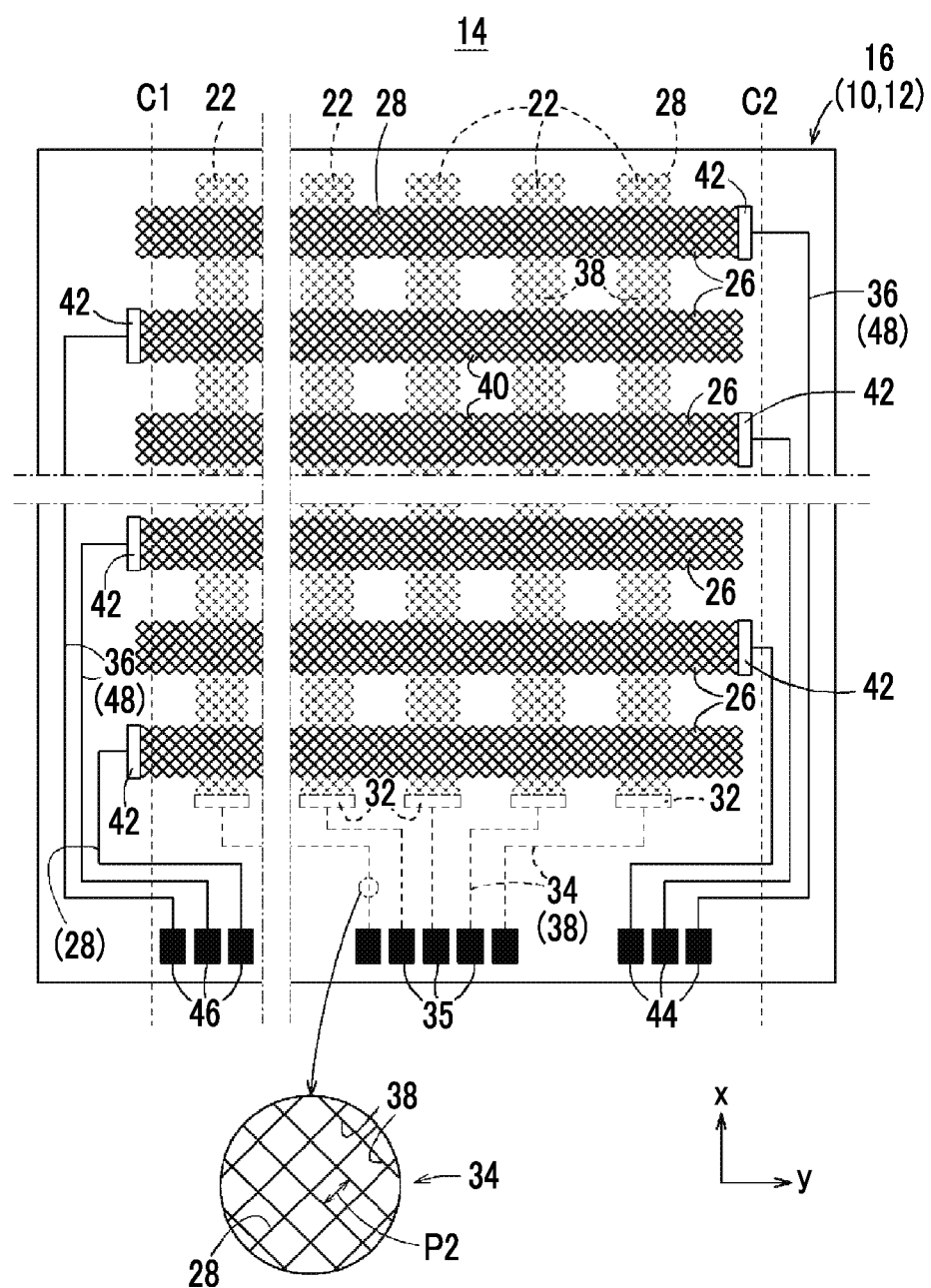
FIG. 1 is a schematic plan view showing a capacitive touch panel including a conductive sheet for a touch panel according to an embodiment of the invention in an exploded manner.
Figure 2:
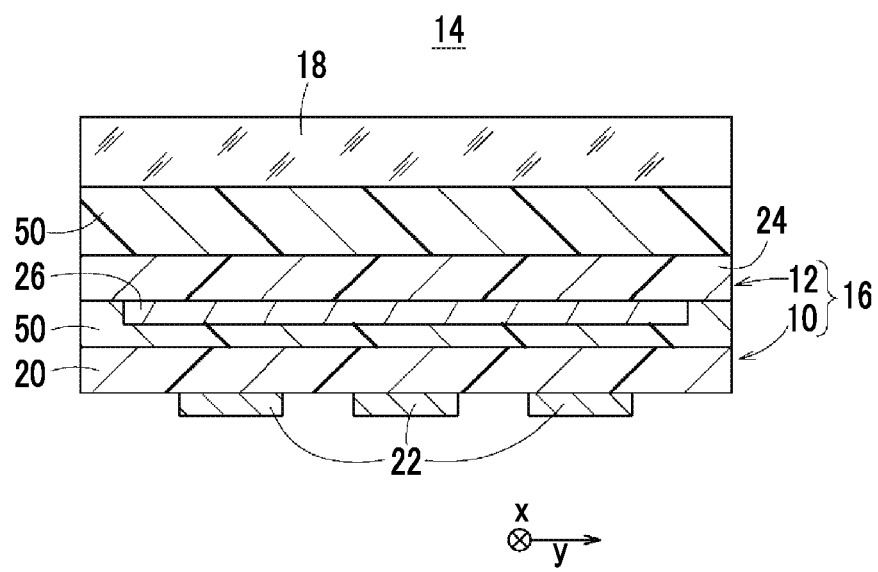
FIG. 2 is a schematic sectional view showing a main part along a thickness direction of the capacitive touch panel of FIG. 1.

FIG. 1 is a schematic plan view showing a touch panel 14 (capacitive touch panel) including a first conductive sheet 10 for a touch panel and a second conductive sheet 12 for a touch panel as a conductive sheet for a touch panel according to this embodiment in an exploded manner, and FIG. 2 is a schematic sectional view showing a main part along a thickness direction. The touch panel 14 is bonded to a display device (not shown) to constitute a three-dimensional touch panel-equipped display device.

The display device is not particularly limited, and preferred examples thereof include a liquid crystal display, a plasma display, an organic electro-luminescence (EL) display, an inorganic EL display, an electronic paper, and the like.

The touch panel 14 has a laminated conductive sheet 16 which is a sensor body, a control circuit (not shown), and a cover lens 18 (see FIG. 2) which covers the top surface of the touch panel 14. Of these, the laminated conductive sheet 16 is constituted by laminating the first conductive sheet 10 for a touch panel and the second conductive sheet 12 for a touch panel according to this embodiment as shown in FIG. 2.

The first conductive sheet 10 for a touch panel has a first resin film 20 and a plurality of lower detection electrodes 22 formed on one surface of the first resin film 20. The second conductive sheet 12 for a touch panel has a second resin film 24 and a plurality of upper detection electrodes 26 formed on one surface of the second resin film 24. The lower detection electrode 22 is an electrode on a side distant from a touch surface (operation surface) between a pair of electrodes of the touch panel 14, and the upper detection electrode 26 is an electrode on a side near the touch surface between a pair of electrodes of the touch panel 14.

The first resin film 20 is a transparent body, and is made of, for example, polyesters, such as polyethylene terephthalate (PET) and polyethylene naphthalate (PEN); polyolefins, such as polyethylene (PE), polypropylene (PP), polystyrene, and polyethylene vinyl acetate (EVA); vinyl-based resins; and others, polycarbonate (PC), polyamide, polyimide, acrylic resin, triacetylcellulose (TAC), cycloolefin polymer (COP), cycloolefin copolymer (COC), and the like. It is preferable that the transmittance of the first resin film 20 is equal to or greater than 85%.

The thickness of the first resin film 20 is preferably 20 to 350 μm, more preferably, 30 to 250 μm, and particularly preferably, 30 to 100 μm.

The lower detection electrodes 22 have a plurality of band-shaped patterns extending in a first direction (x direction/longitudinal direction) in FIG. 1. Here, while the "band shape" indicates an elongated shape extending with a predetermined width-direction dimension, it is assumed that a shape in which the width-direction dimension fluctuates periodically (a wide width and a narrow width are repeated) is also included in the "band shape". The same applies to the upper detection electrodes 26.

The lower detection electrodes 22 have a predetermined width-direction dimension toward a second direction (a direction orthogonal to the first direction: y direction), and a plurality of lower detection electrodes 22 are arranged in parallel along the y direction. The first direction is a direction perpendicular to the plane of FIG. 2, and the second direction is a right-left direction of the plane of FIG. 2.

The detection region refers to the inside of a region surrounded by connection lines when the respective ends (long sides and short sides) of the detection electrodes are connected virtually. That is, all of the lower detection electrodes 22 are formed inside the detection region. The same applies to the upper detection electrodes 26 described below.

Figure 3:
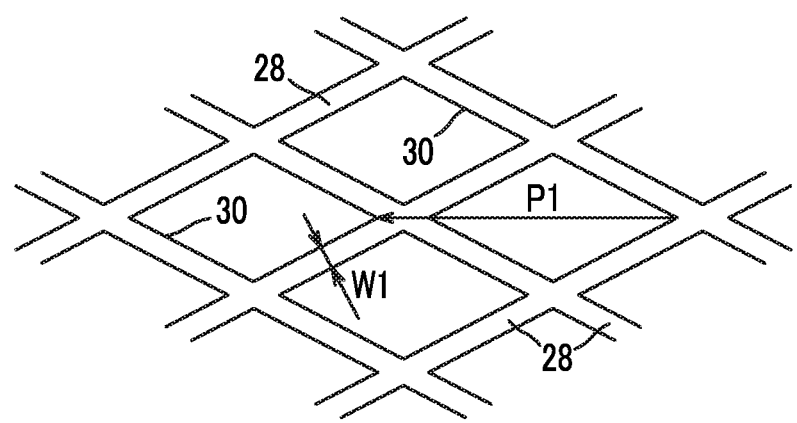
FIG. 3 is a schematic plan view showing an example of cells which form detection electrodes made of thin conductive metal wires and formed on the conductive sheet.

As shown in FIG. 3, each of the lower detection electrodes 22 is formed by making thin conductive metal wires 28 intersect each other. With this intersection, a plurality of spaces (aperture) surrounded by the thin conductive metal wires 28, that is, a plurality of first cells 30, are formed. The thin conductive metal wires 28 are mode of silver, copper, gold, aluminum, molybdenum, chromium, nickel, an alloy containing one or more thereof or the like. Of these, from the viewpoint of conductivity, silver is particularly preferable.

In this case, the first cells 30 have the same shape. That is, each lower detection electrode 22 which is formed by the thin conductive metal wires 28 is formed of a first metal mesh in which a plurality of first cells 30 having the same shape are linked, and shows a so-called regular pattern.

The first cells 30 have, for example, a parallelogram shape, and typically, have a rhombic shape in which four sides have the same length (see FIG. 3). In this case, the rhombic shape is not limited to a horizontally long rhombic shape, and may be of course a vertically long rhombic shape. It is preferable that the angle of the vertex of the rhombic shape is set such that moire with a pixel pattern of a display device does not occur.

In the first cells 30, the width-direction dimension (wire width) W1 of the thin conductive metal wires 28 is set to be equal or less than 5 μm. An average cell pitch P1 (thin wire interval) of the first cells 30 can be set to 100 μm to 500 μm. With this, moire of a conductive pattern by the thin conductive metal wires 28 and the appearance of the thin wires are improved, transmittance is high, and visibility is excellent. That is, the thin conductive metal wires 28 constituting the first metal mesh are hardly visually recognized.

In a case where the first cells 30 have the same aperture ratio (the non-occupancy of the thin conductive metal wires 28), the smaller the wire width, the larger the number of thin conductive metal wires 28 constituting each of the lower detection electrodes 22. Accordingly, an effect of preventing disconnection of the lower detection electrodes 22 is increased. In particular, in a case where the aperture ratio of each of the first cells 30 is high to be equal to or greater than 94.0%, the wire width W1 of the thin conductive metal wires 28 is set to be equal to or less than 5 μm, whereby it is possible to increase the number of thin conductive metal wires 28 per unit area to the number of thin conductive metal wires 28 such that disconnection of the lower detection electrodes 22 can be effectively prevented.

If the wire width W1 of the thin conductive metal wires 28 is excessively small, the bendability of the thin conductive metal wires 28 is degraded. For this reason, there is a possibility that disconnection occurs when forming the laminated conductive sheet 16 into a three-dimensional curved body. In order to reduce this possibility, it is preferable that the wire width W1 of the thin conductive metal wires 28 is equal to or greater than 1 μm. In a case where the wire width W1 is set to this level, it is possible to secure sufficient conductivity in the lower detection electrodes 22.

Although an example of a rhombic shape has been described in FIGS. 1 and 3, the first cells 30 may be a regular pattern constituted of a square shape or a polygonal shape, such as a hexagonal shape or a triangular shape. Alternatively, a random mesh electrode (random pattern) in which random cells having random shapes or sizes is linked may be used.

Figure 4:
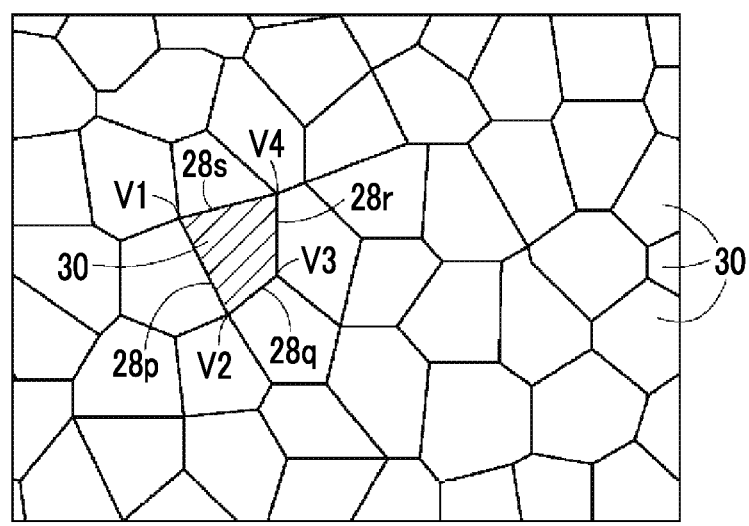
FIG. 4 is a schematic plan view showing an example of cells when a detection electrode has a random mesh pattern.

An example of the lower detection electrode 22 in a case where the first cells 30 are random cells is shown in FIG. 4. In this case, the hatched first cell 30 is formed by a thin conductive metal wire 28$p$ connecting a vertex V1 and a vertex V2 in a straight line, a thin conductive metal wire 28$q$ connecting the vertex V2 and a vertex V3 in a straight line, a thin conductive metal wire 28$r$ connecting the vertex V3 and a vertex V4 in a straight line, and a thin conductive metal wire 28$s$ connecting the vertex V4 and the vertex V1 in a straight line, and has a polygonal shape. Similarly, other cells (first cells 30) show a polygonal shape. In this way, the random mesh electrode is difference in the shape or size of the cell, and has low periodicity (regularity or uniformity).

In regard to the random pattern, the shape can be set by, for example, a Voronoi division method or a Delaunay triangle division method. A specific operation or the like for setting the random pattern is described in detail in the paragraphs <0080> to <0083> of JP2013-54619A.

A difference in cell size in the random mesh electrode, that is, a random rate is preferably 2% to 20%, and more preferably, 4% to 10%. More preferably, the random rate is 6% to 8%. Here, the random rate is defined by extracting arbitrary 30 first cells 30 constituting a random mesh pattern, and when a maximum value of a length Ld of one side of each first cell 30 is Ldmax, a minimum value of the length Ld is Ldmin, and an average value of the length Ld is Ldave, extracting a larger value between the values determined by Expressions (2) and (3) described below in each cell, and taking an average value of the 30 cells.

$$(Ld\text{max} - Ld\text{ave})/Ld\text{ave} \times 100 \quad (2)$$

$$(Ld\text{ave} - Ld\text{min})/Ld\text{ave} \times 100 \quad (3)$$

If the random rate becomes less than 2%, the cell size of each first cell 30 becomes almost uniform, and an effect of suppressing moire by the arrangement of a plurality of first cells 30 is degraded. On the contrary, if the random rate exceeds 20%, there is a possibility that variation occurs in the resistance value of each of the lower detection electrodes 22, and detection sensitivity is degraded. Furthermore, there is a possibility that a sense of graininess noise occurs in a display screen.

It is preferable that the average cell pitch P1 (an average mesh pitch of a first metal mesh/see FIG. 3) of the lower detection electrodes 22 configured as above is 100 to 500 μm, and more preferably, 100 to 400 μm. Here, the average cell pitch P1 of the lower detection electrodes 22 is defined by an average length when the maximum length of the first cell 30 in the x direction, in which the lower detection electrode 22 extends, are measured in arbitrary 30 cells.

As shown in FIG. 1, a first terminal wiring portion 34 which is a peripheral wiring is electrically connected to one end portion of each of the lower detection electrodes 22 through a first connection portion 32. In this way, the first connection portion 32 is provided, whereby the flow of a current from the first terminal wiring portion 34 to the lower detection electrode 22 is smoothened and the sensitivity of the touch panel 14 is improved. The lower detection electrode 22 and the first terminal wiring portion 34 which is a peripheral wiring may be directly electrically connected to each other without providing the first connection portion 32.

The first terminal wiring portion 34 extends toward a substantially central portion of one side extending along the second direction (y direction) and is electrically connected to a first terminal portion 35. The first terminal portion 35 is electrically connected to the control circuit (not shown).

The peripheral wiring region refers to the inside of a region where the first terminal wiring portions 34 are formed. That is, all of the first terminal wiring portions 34 are formed inside the peripheral wiring region. The same applies to second terminal wiring portion 36 described below.

In FIG. 1, an enlarged view of a portion surrounded by a circle is also shown. As will be understood from the enlarged view, in this embodiment, each of the first terminal wiring portions 34 is formed of a second metal mesh in which a plurality of second cells 38 having the same shape are linked. The first terminal wiring portions 34 show a regular pattern. In a case of providing the first connection portions 32, the first connection portions 32 are also formed of a second metal mesh. The mesh cell shape of the first connection portions 32 may have the same shape as or may be different from the second cells 38.

The second cells 38 have, for example, a parallelogram shape, and typically, have a rhombic shape in which four sides have the same length. In this case, the rhombic shape is not limited to a horizontally long rhombic shape, and may be of course a vertically long rhombic shape.

Figure 5:
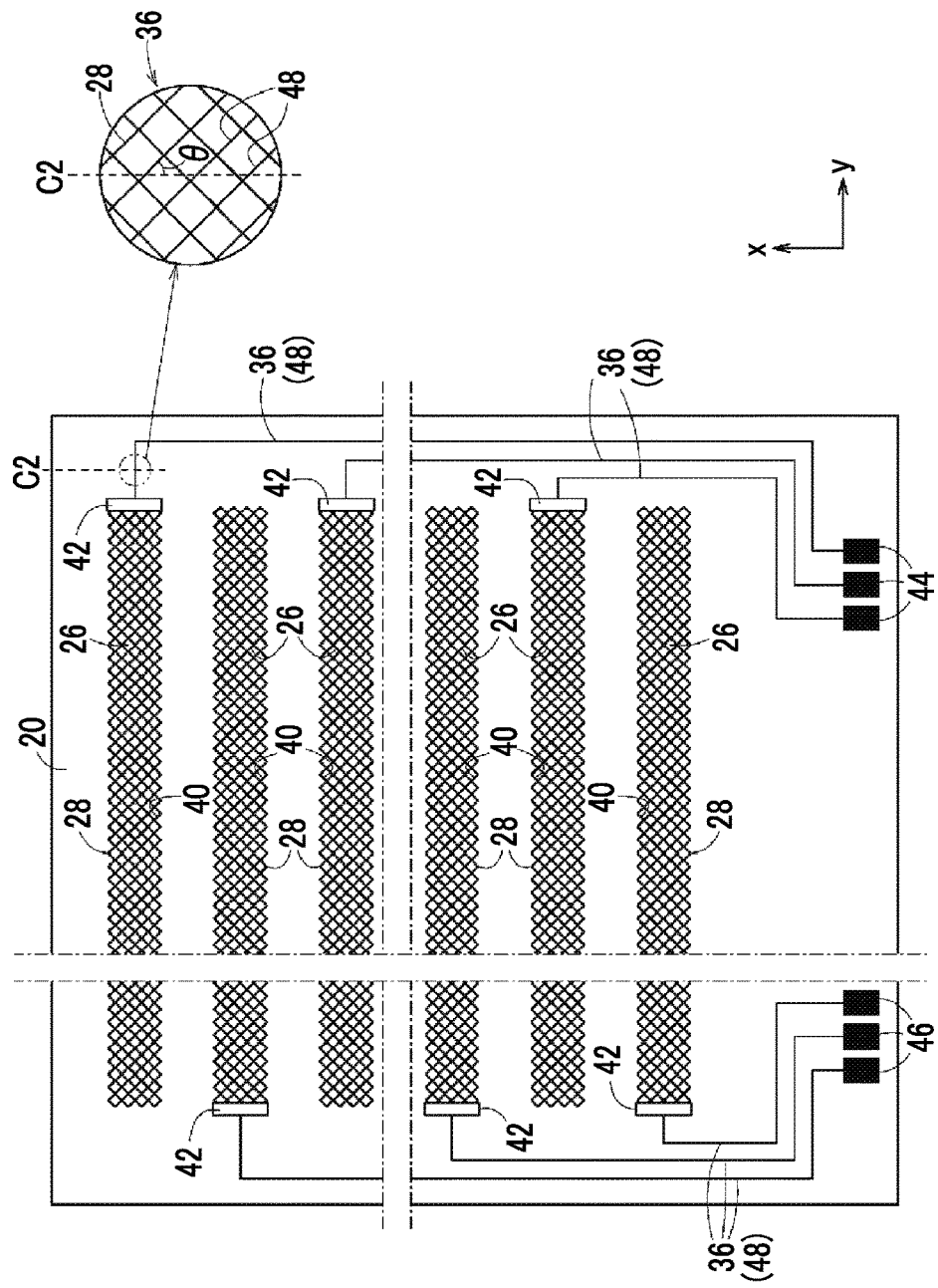
FIG. 5 is an example of a schematic plan view of the conductive sheet for a touch panel.

Although an example of a rhombic shape has been given in FIG. 5, the second cells 38 may be a regular pattern constituted of a quadrangular shape or a polygonal shape, such as a hexagonal shape or a triangular shape. It is preferable that the shape of the second cells 38 is a rhombic shape, a square shape, or a regular triangular shape for the purpose of reducing the resistance value. In the peripheral wiring portion, there is no restriction to visibility, such as transmittance or moire with a pixel pattern of a display device. Accordingly, even if the second cells 38 are formed into this shape, there is no concern that transmittance is reduced or moire occurs.

The first connection portions 32 and/or the first terminal wiring portions 34 (second metal mesh pattern/second cells 38) having the second metal mesh pattern are formed simultaneously when forming the lower detection electrodes 22 (first metal mesh pattern/first cells 30). In this case, the second metal mesh constituting the second cells 38 has thin conductive metal wires made of the same material as the first metal mesh constituting the first cells 30. Accordingly, it is preferable that the thin conductive metal wires have the same film thickness in the first cells 30 (first metal mesh) and the second cells 38 (second metal mesh). In this specification, the "same material" is not a meaning that principal metals forming the thin conductive metal wires are the same, but has a meaning that all of the respective components contained in the thin conductive metal wires or the compositional ratios thereof, such as the types and proportions of a binder contained in the thin conductive metal wires and metals forming an alloy, are the same. In this specification, the "same film thickness" means that the film thicknesses are substantially the same. Specifically, the "same film thickness" is defined as a case where the difference in film thickness is within 5%.

It is preferable that the thin conductive metal wires substantially have the same wire width in the first cells 30 (first metal mesh) and the second cells 38 (second metal mesh). Accordingly, in this case, when the wire width of the thin conductive metal wires of the first cells 30 (first metal mesh) is set to, for example, 4 µm, the wire width of the thin conductive metal wires of the second cells 38 (second metal mesh) also becomes 4 µm. In this specification, the "same wire width" means that the wire widths are substantially the same. Specifically, the "same wire width" is defined as a case where the difference in wire width is within 0.5 µm.

Since the second cells 38 constituting the first connection portions 32 and the first terminal wiring portions 34 are formed simultaneously when forming the first cells 30, the lower detection electrodes 22, the first connection portions 32, and the first terminal wiring portions 34 are linked by the thin conductive metal wires 28 without seams (seamless). For this reason, the thin conductive metal wires 28 have sufficient strength to three-dimensional molding at the boundary between the lower detection electrodes 22 and the first connection portions 32 and the boundary between the first connection portions 32 and the first terminal wiring portions 34.

Even in a case of a configuration in which the lower detection electrodes 22 and the first terminal wiring portions 34 which are peripheral wirings may be directly electrically connected to each other without providing the first connection portions 32, since the second cells 38 constituting the first terminal wiring portions 34 are formed simultaneously when forming the first cells 30, as above, the lower detection electrodes 22 and the first terminal wiring portions 34 are linked by the thin conductive metal wires 28 without seams (seamless). Accordingly, in this case, the thin conductive metal wires 28 have sufficient strength to three-dimensional molding at the boundary between the lower detection electrodes 22 and the first terminal wiring portions 34.

It is preferable that the wire width of the second cells 38 is equal to or greater than 1 µm like the first cells 30. This is because sufficient bendability and conductivity are secured.

It is preferable that the wire width of the second cells 38 is equal to or less than 10 µm. This is because, if the difference between the wire width of the second cells 38 and the wire width of the first cells 30 becomes equal to or greater than 10 µm, it is considered that disconnection is likely to occur at the boundary where the wire width of the thin conductive metal wires 28 changes.

An average cell pitch P2 (an average mesh pitch of the second metal mesh) of the first terminal wiring portions 34 is defined as an average length when the maximum length of the second cells 38 linked along the extension direction of the first terminal wiring portion 34 is measured in arbitrary 30 cells.

It is preferable that the average cell pitch P2 of the first terminal wiring portions 34 is smaller than the average cell pitch P1 of the lower detection electrodes 22. With this, reduction in resistance of the first terminal wiring portions 34 is achieved. It is preferable that the average cell pitch P2 of the first terminal wiring portions 34 is 10 µm to 50 µm.

It is preferable that the average cell pitch P2 of the first terminal wiring portions 34 is 1/n (where n is a natural number equal to or greater than 4 and equal to or less than 20) of the average cell pitch P1 of the lower detection electrodes 22. In other words, it is preferable that the average cell pitch P1 of the lower detection electrodes 22 is set to an integer multiple of the average cell pitch P2 of the first terminal wiring portions 34. With this, it is possible to connect the lower detection electrodes 22 and the first terminal wiring portions 34 without damaging the connection (continuity) of the thin conductive metal wires 28 constituting the lower detection electrodes 22 and the thin conductive metal wires 28 constituting the first terminal wiring portions 34. For this reason, the flow of a current is smoothened. In addition, an effect of preventing disconnection is obtained.

The second resin film 24 of the second conductive sheet 12 for a touch panel is made of a transparent body like the first resin film 20. Suitable examples of the transparent body include those described above.

As shown in FIGS. 1 and 5, the upper detection electrodes 26 formed on the second resin film 24 has a plurality of band-shaped patterns extending in the second direction (y direction/longitudinal direction). The upper detection electrodes 26 have a predetermined width-direction dimension toward the first direction (the direction orthogonal to the second direction: x direction), and a plurality of upper detection electrodes are arranged in parallel along the x direction.

Like the lower detection electrodes 22, each of the upper detection electrodes 26 is formed by making the thin conductive metal wires 28 intersect each other. With this intersection, third cells 40 surrounded by the thin conductive metal wires 28 are formed.

The mesh pattern of each of the upper detection electrodes 26 can be a regular pattern or a random pattern like the lower detection electrodes 22. Of these, a form in which the lower detection electrodes 22 have a random pattern and the upper detection electrodes 26 have a regular pattern is preferable. According to this form, both of moire with a pixel pattern of a display device and color noise are possible. A preferable wire width and a preferable average cell pitch of the thin conductive metal wires 28 in the third cells 40 and the reasons therefor are the same as in the first cells 30, and thus, detailed description thereof will not be repeated.

As shown in FIGS. 1 and 5, a second terminal wiring portion 36 is electrically connected to one end portion of each of the upper detection electrodes 26 through a second connection portion 42. In this way, the second connection portion 42 is provided, whereby the flow of a current from the second terminal wiring portion 36 to the upper detection electrode 26 is smoothened and the sensitivity of the touch panel 14 is improved. The upper detection electrode 26 and the second terminal wiring portion 36 which is a peripheral wiring may be directly electrically connected to each other without providing the second connection portion 42.

A configuration in which the second connection portions 42 are provided will be described. For example, the second terminal wiring portion 36 started from the second connection portion 42 of the odd-numbered upper detection electrode 26 is diverted so as to be directed to the first terminal portion 35 side of the second resin film 24 along one right side extending along the x direction, and then, is electrically connected to a right second terminal portion 44 provided near the first terminal portion 35 with the second resin film 24 sandwiched therebetween.

The second terminal wiring portion 36 started from the second connection portion 42 of the even-numbered upper detection electrode 26 is diverted so as to be directed to the first terminal portion 35 side of the second resin film 24 along one left side extending along the x direction, and then, is electrically connected to a left second terminal portion 46 provided near the first terminal portion 35 with the second resin film 24 sandwiched therebetween.

Like the first terminal wiring portions 34, the second terminal wiring portions 36 are formed by making the thin conductive metal wires 28 intersect each other. With this intersection, as shown in the enlarged view of a portion surrounded by a circle in FIG. 5, fourth cells 48 surrounded by the thin conductive metal wires 28 are formed. In a case of providing the second connection portions 42, the second connection portions 42 are formed of a mesh formed of the thin conductive metal wires 28. The mesh cell shape of the second connection portions 42 may have the same as or may be different from the fourth cells 48.

The mesh pattern of the second terminal wiring portions 36 can be a regular pattern like the first terminal wiring portions 34. A preferable wire width and a preferable average cell pitch of the thin conductive metal wires 28 in the fourth cells 48 and the reasons therefor are the same as in the second cell 38, and thus, detailed description thereof will not be repeated. It is preferable that the first terminal wiring portions 34 and the second terminal wiring portions 36 are not positioned to overlap each other for reduction in parasitic capacitance.

As shown in FIG. 2, the first resin film 20 and the second resin film 24 are bonded through an optical adhesive layer (optical clear adhesive (OCA)) 50. At this time, the first resin film 20 is arranged such that the surface on which the lower detection electrodes 22, the first terminal wiring portions 34, and the like are formed becomes a lower end surface side, the second resin film 24 is arranged such that the surface on which the upper detection electrodes 26, the second terminal wiring portions 36, and the like are formed becomes a lower end surface side. The film thickness of the OCA 50 is preferably 20 μm to 300 μm, and more preferably, 25 μm to 200 μm.

A cover lens 18 is bonded to an upper end surface of the second resin film 24 through the OCA 50. As a constituent material of the cover lens 18, for example, glass, tempered glass, sapphire, or resin, such as polycarbonate (PC) or polymethyl methacrylate (PMMA), can be suitably used.

In the touch panel 14 according to this embodiment, for example, the laminated conductive sheet 16 which is a sensor body is bent along bending lines C1 and C2 indicated by broken lines in FIG. 1. In the laminated conductive sheet 16, portions outside the bending lines C1 and C2 are bent to the display device side (the far back side in the plane of FIG. 1). That is, the touch panel 14 is a three-dimensional body which has a concave shape with two side surfaces formed by bending.

Figure 6:
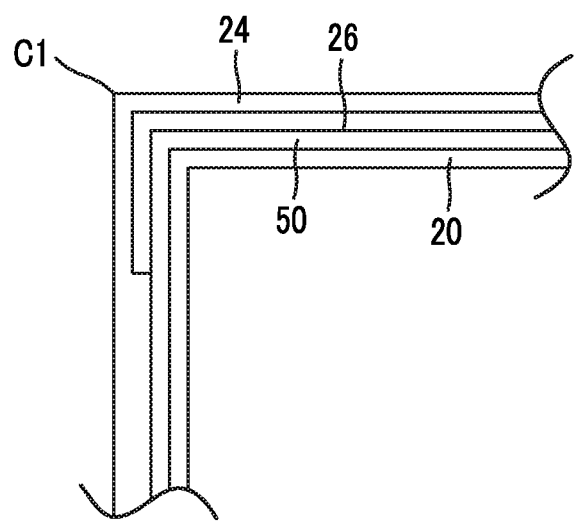
FIG. 6 is a schematic sectional view showing a main part of the capacitive touch panel near a bending line C1 in FIG. 1.
Figure 7:
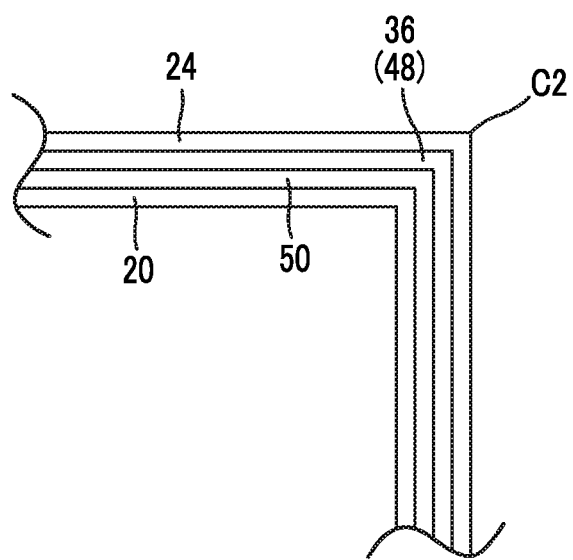
FIG. 7 is a schematic sectional view showing a main part of the capacitive touch panel near a bending line C2 in FIG. 1.

At the time of the bending described above, as shown in FIGS. 6 and 7, one end of the upper detection electrode 26 and the second terminal wiring portion 36 started from the odd upper detection electrode 26 are bent. With this bending, the bent portions of the first resin film 20 and the second resin film 24, in particular, the outsides of the bent portions are extended.

As described above, the upper detection electrode 26 and the second terminal wiring portion 36 are formed as a metal mesh pattern. Accordingly, the upper detection electrode 26 and the second terminal wiring portion 36 extend to follow the extension of the second resin film 24. For this reason, disconnection hardly occurs in the upper detection electrode 26 and the second terminal wiring portion 36.

In addition, since the upper detection electrode 26 and the second terminal wiring portion 36 are positioned on the lower end surface of the second resin film 24, in the bent portions, the upper detection electrode 26 and the second terminal wiring portion 36 face the inside. In the bent portions, the inside has a smaller extension amount than the outside. Accordingly, in this case, the extension amounts of the upper detection electrode 26 and the second terminal wiring portion 36 decrease compared to a case where the upper detection electrode 26 and the second terminal wiring portion 36 are positioned outside the bend parts. In this case, decrease in the extension amount contributes to disconnection prevention of the upper detection electrode 26 and the second terminal wiring portion 36.

As will be understood from FIG. 1, the extension direction (y direction) of the upper detection electrodes 26 and the second terminal wiring portions 36 is inclined with respect to the bending line direction (x direction). In the third cells 40 and the fourth cells 48, the bending lines C1 and C2 intersect the thin conductive metal wires 28 in an inclined manner. For this reason, the third cells 40 and the fourth cells 48 have sufficient strength to bending. That is, disconnection hardly occurs.

A preferable inclination angle of the thin conductive metal wires 28 with respect to the bending lines C1 and C2 is 20° to 70°. This angle is set, whereby disconnection more hardly occurs. In particular, the inclination angle is preferably 25° to 40° or 50° to 65°. In this angle range, both of disconnection prevent and improvement of visibility can be achieved.

The inclination angle of the thin conductive metal wires 28 with respect to the bending lines C1 and C2 refers to an angle of an acute angle at which the bending lines C1 and C2 and the thin conductive metal wires 28 intersect. For example, an angle θ shown in FIG. 5 corresponds to the inclination angle of the thin conductive metal wires 28 with respect to the bending line C2.

In particular, it is preferable that the inclination angle of the thin conductive metal wires 28 constituting each of the lower detection electrodes 22 with respect to the bending lines C1 and C2 and the inclination angle of the thin conductive metal wires 28 constituting each of the first terminal wiring portions 34 with respect to the bending lines C1 and C2 are the same within the above-described preferable inclination angle range. The same applies to the inclination angle of the thin conductive metal wires 28 constituting each of the upper detection electrodes 26 with respect to the bending lines C1 and C2 and the inclination angle of the thin conductive metal wires 28 constituting each of the second terminal wiring portions 36 with respect to the bending lines C1 and C2.

In a case of providing the first connection portions 32, it is preferable that the inclination angle of the thin conductive metal wires 28 constituting each of the first connection portions 32 with respect to the bending lines C1 and C2, the inclination angle of the thin conductive metal wires 28 constituting each of the lower detection electrodes 22 with respect to the bending lines C1 and C2, and the inclination angle of the thin conductive metal wires 28 constituting each of the first terminal wiring portions 34 with respect to the bending lines C1 and C2 are the same within the above-described preferable inclination angle range. Similarly, in a case of providing the second connection portions 42, it is preferable that the inclination angle of the thin conductive metal wires 28 constituting each of the second connection portions 42 with respect to the bending lines C1 and C2, the inclination angle of the thin conductive metal wires 28 constituting each of the upper detection electrodes 26 with respect to the bending lines C1 and C2, and the inclination angle of the thin conductive metal wires 28 constituting each of the second terminal wiring portions 36 with respect to the bending lines C1 and C2 are the same within the above-described inclination angle range.

From the above reason, disconnection of the upper detection electrodes 26 and the second terminal wiring portions 36 is suppressed. Accordingly, it is possible to prevent an increase in resistance due to disconnection of the second terminal wiring portions 36. For this reason, it is possible to constitute a three-dimensional touch panel 14 having excellent detection sensitivity.

In FIG. 1, although a space between adjacent lower detection electrodes 22 and a space between adjacent upper detection electrodes 26 are left blank, it is preferable that a first stress distribution portion is arranged at least one of the space between adjacent lower detection electrodes 22 or the space between adjacent upper detection electrodes 26.

The first stress distribution portion is insulated from both the detection electrode (the lower detection electrode 22 or the upper detection electrode 26) and the peripheral wiring (the first terminal wiring portion 34 or the second terminal wiring portion 36), and has the same surface density as that of the first metal mesh constituting the detection electrode. Here, the surface density of the metal mesh is represented as the amount of thin conductive metal wires constituting the metal mesh per certain unit area, and as shown in Expression (1) described above, can be determined by multiplying the volume weight density α of the thin conductive metal wires, the occupancy of the thin conductive metal wires of the metal mesh portion, and the film thickness of the thin conductive metal wires. The same surface density is set, whereby an effect of diffusing stress is obtained. In this specification, the "same surface density" means that the surface densities are substantially the same. Specifically, the "same surface density" is defined as a case where the difference in surface density is within 5%.

Figure 8:
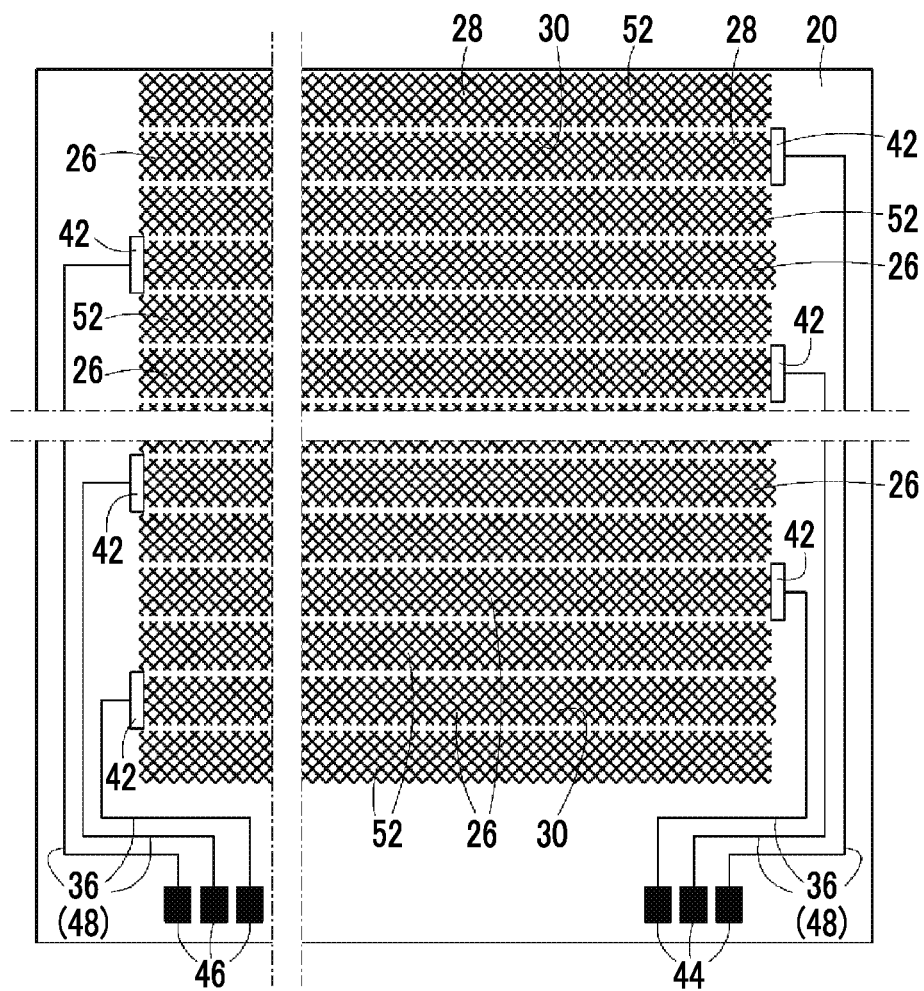
FIG. 8 is an example of a schematic plan view of a conductive sheet on which a stress distribution portion between adjacent detection electrodes.

Like the detection electrodes, it is preferable that the first stress distribution portion is formed of a metal mesh in which thin conductive metal wires are arranged to intersect each other. A preferable shape of cells forming the metal mesh is the same mesh shape as that of the first cells 30 in a case where the first stress distribution portion is interposed between the lower detection electrodes 22, and has the same shape as that of the third cells 40 in a case where the first stress distribution portion is interposed between the upper detection electrodes 26. In this specification, the "same mesh shape" means that the intersection angles, pitches, and wire widths of the cells are the same. Even in a shape in which a part of a cell is open (disconnected), if the intersection angles, the pitches, and the wire widths are the same, the shapes of the cells are defined as the "same mesh shape". FIG. 8 shows an example in which a first stress distribution portion 52 is interposed between the upper detection electrodes 26.

A more preferable form of the first stress distribution portion is that thin conductive metal wires forming the first stress distribution portion are made of the same material as the thin conductive metal wires 28 constituting the detection electrode (the lower detection electrode or the upper detection electrode 26). It is particularly preferable that the first stress distribution portion is constituted using the same material as the thin conductive metal wires 28 constituting the detection electrode, and has the same mesh shape as that of the detection electrode because not only the effect of stress distribution (diffusion) but also an effect of reducing the pattern appearance of the detection electrodes or the wire appearance of the thin conductive metal wires are obtained.

The material and the film thickness of the thin conductive metal wires of the first stress distribution portion are the same as those of the thin conductive metal wires 28 constituting the detection electrode and the mesh shape of the first stress distribution portion is the same as that of the metal mesh constituting the detection electrode, whereby it is possible to obtain the first stress distribution portion having the same surface density as that of the detection electrode. If the surface densities are the same, that is, the difference in surface density falls within 5%, disconnection may be formed in the metal mesh forming the first stress distribution portion.

In a case of providing the first stress distribution portion, it is more preferable that a stress distribution portion (second stress distribution portion) is also provided between the peripheral wirings. The second stress distribution portion is insulated from both of the detection electrode (the lower detection electrode 22 or the upper detection electrode 26) and the peripheral wiring (the first terminal wiring portion 34 or the second terminal wiring portion 36), and has the same surface density as that of the second metal mesh constituting the peripheral wiring. The definition of the surface density is as above, and as described above, the same surface density is set, whereby an effect of diffusing stress is obtained.

Like the peripheral wiring, it is preferable that the second stress distribution portion is formed of a metal mesh in which thin conductive metal wires are arranged to intersect each other. A preferable shape of cells forming the metal mesh is the same mesh shape as that of the second cells 38 in a case where the second stress distribution portion is interposed between the first terminal wiring portions 34, and is the same mesh shape as that of the fourth cells 48 in a case where the second stress distribution portion is interposed between the second terminal wiring portions 36.

A more preferable form of the second stress distribution portion is that the thin conductive metal wires forming the second stress distribution portion are made of the same material as the thin conductive metal wires 28 constituting the peripheral wiring (the first terminal wiring portion 34 or the second terminal wiring portion 36). It is particularly preferable that the second stress distribution portion is constituted using the same material as the thin conductive metal wires constituting the peripheral wiring and the has the same mesh shape as that of the peripheral wiring because not only the effect of stress diffusion described above but also an effect of reducing the pattern appearance of the peripheral wirings or the wire appearance of the thin conductive metal wires are obtained.

The material and the film thickness of the thin conductive metal wires of the second stress distribution portion are the same as those of the thin conductive metal wires constituting the peripheral wiring and the mesh shape of the second stress distribution portion is the same as that of the metal mesh constituting the peripheral wiring, whereby it is possible to obtain the second stress distribution portion having the same surface density as that of the detection electrode. If the surface densities are the same, that is, the difference in surface density falls within 5%, disconnection may be formed in the metal mesh forming the second stress distribution portion.

Figure 9:
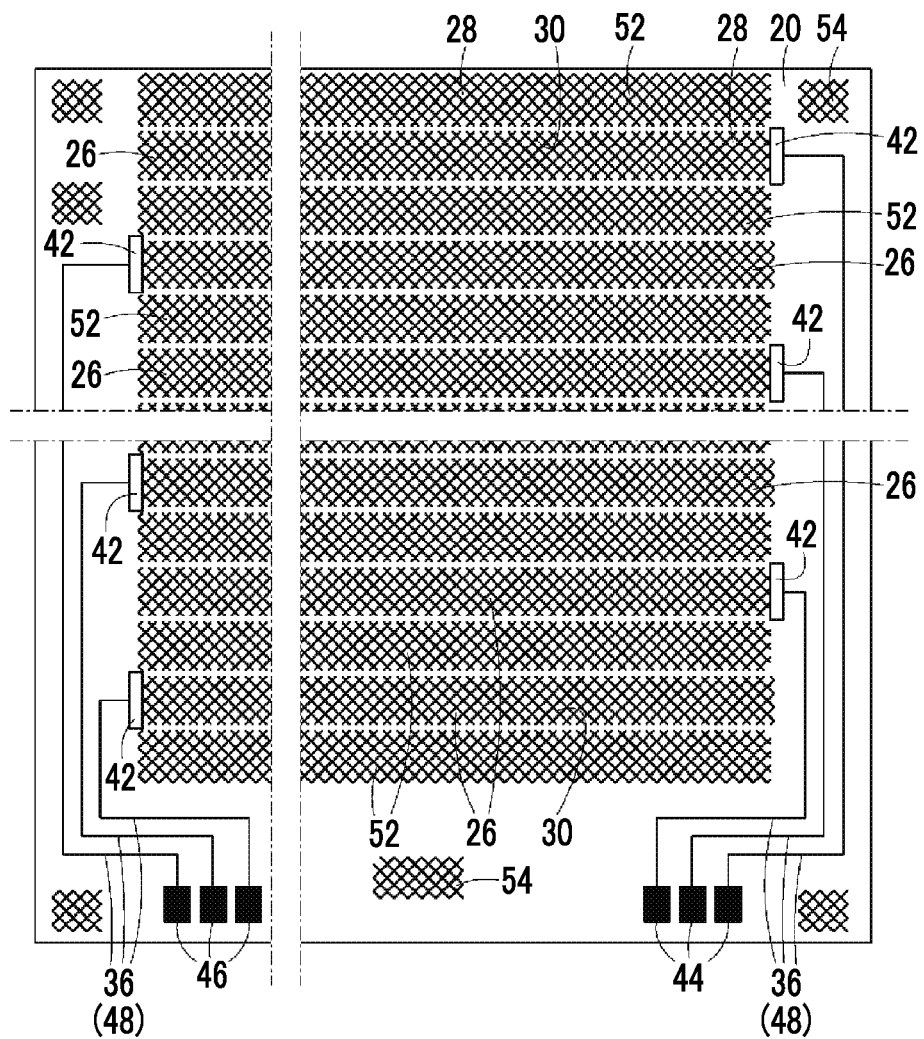
FIG. 9 is an example of a schematic plan view of a conductive sheet on which stress distribution portions are respectively formed between adjacent detection electrodes and between adjacent peripheral wirings.

In this way, in a case where the stress distribution portion is provided between the lower detection electrodes 22, it is more preferable that a stress distribution portion is also provided between adjacent first terminal wiring portions 34. In a case where the stress distribution portion is provided between the upper detection electrodes 26, it is more preferable that a stress distribution portion is also provided between adjacent second terminal wiring portions 36. FIG. 9 shows an example of a case where the first stress distribution portion 52 is interposed between the upper detection electrodes 26 and a second stress distribution portion 54 is provided between the second terminal wiring portions 36.

In FIG. 9, although a part of the stress distribution portion 54 is shown for ease of understanding, actually, the stress distribution portion 54 is formed over the entire peripheral wiring region. An actual average cell pitch of the stress distribution portion 54 is the same as that of the fourth cells 48.

The stress distribution portions 52 and 54 (the first stress distribution portion or the second stress distribution portion) are provided, stress is distributed evenly in the detection region or the peripheral wiring region. For this reason, it is possible to prevent the local extension of the first resin film 20 or the second resin film 24. Accordingly, it is possible to further suppress disconnection or an increase in resistance.

Figure 10:
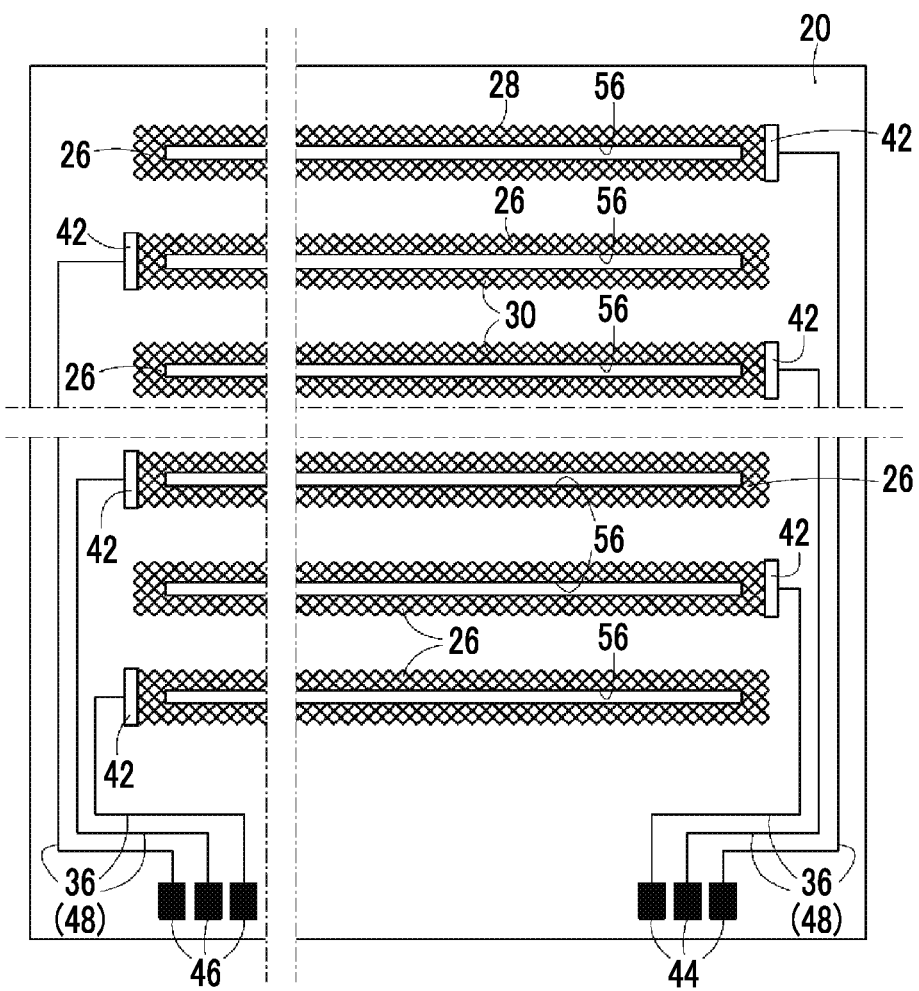
FIG. 10 is an example of a schematic plan view of u conductive sheet on which a stress relaxation portion is provided inside a detection electrode.

A stress relaxation portion may be formed in the inside of at least the lower detection electrode 22 or the upper detection electrode 26. FIG. 10 shows an example in which a stress relaxation portion 56 is formed of a blank portion formed by cutting a part of the upper detection electrode 26 in the extension direction.

In this case, if a part of the second resin film 24 corresponding to the inside (stress relaxation portion) of the upper detection electrode 26 is extended, stress occurring at this time is relaxed by the stress relaxation portion 56. For this reason, since the propagation of stress through the upper detection electrode 26 is avoided, the progress of disconnection of the thin conductive metal wires 28 constituting the upper detection electrode 26 is suppressed. As a result, it is preferable that the width of the stress relaxation portion capable of further preventing an increase in resistance of the upper detection electrode 26 is 20% to 60% with respect to the electrode width of the upper detection electrode 26. With this range, it is possible to more effectively relax stress and to prevent disconnection of the thin conductive metal wires.

In FIG. 10, although the stress relaxation portion 56 is shown in a blank portion, it is preferable that the stress relaxation portion 56 is formed by partially disconnecting the thin conductive metal wires 28. With this configuration, an effect of preventing the pattern appearance of the stress relaxation portion 56 is obtained. It is preferable that the disconnection width when partially disconnected is 5 µm to 30 µm.

The first conductive sheet 10 for a touch panel for forming the lower detection electrodes 22 may of course have a configuration based on FIGS. 8 to 10.

The lower detection electrodes 22 and the upper detection electrodes 26 can be suitably formed by etching using a photolithography process, a micro-contact printing patterning method, a silver salt method, or an incised metal particle filling method in order to obtain a mesh pattern having a narrow wire width. In order to repeatedly obtain a large quantity of patterns, the silver salt method is preferable.

The micro-contact printing patterning method is a method in which a pattern having a narrow wire width is obtained using a micro-contact printing method. The micro-contact printing method is a method in which an elastic stamp of polydimethyl siloxane is used and a metal substrate is brought into contact with a thiol solution as ink to produce a pattern of a monomolecular film (see Whitesides, Angew. Chem. Int. Ed., 1998, Vol. 37, pp. 550).

A representative process of the micro-contact printing patterning method is, for example, as follows. That is, first, a metal is coated on a substrate (for example, silver is sputtered and coated on a PET substrate).

Next, masking of a monomolecular film is stamped to the substrate coated with the metal using the micro-contact printing method. Thereafter, the metal coated on the substrate is removed by etching excluding a pattern below masking.

In regard to the above, a specific operation and the like are described in detail in the paragraph <0104> of JP2012-519329A.

The incised metal particle filling method is a method in which resist is exposed in a mesh shape to form mesh-shaped grooves and the grooves are filled with ink with metal particles dispersed therein to form a metal mesh. For example, a method described in WO2013/012260A is applicable.

The silver salt method exposes and develops a photosensitive material having a photosensitive silver salt-containing layer to obtain a pattern of the thin conductive metal wires 28 having a mesh shape. A specific operation and the like are described in detail in the paragraphs <0163> to <0241> of JP2009-4348A.

The first resin film 20 on which the lower detection electrodes 22, the first connection portions 32, and the first terminal wiring portions 34 are formed in this way and the second resin film 24 on which the upper detection electrodes 26, the second connection portions 42, and the second terminal wiring portions 36 are bonded through the OCA 50, thereby forming the laminated conductive sheet 16. At this time, the lower detection electrodes 22 and the upper detection electrodes 26 intersect each other with the first resin film 20 sandwiched therebetween.

Next, the end portions of the laminated conductive sheet 16 are bent along the bending lines C1 and C2 shown in FIG. 1. To this end, for example, the laminated conductive sheet 16 may be formed by heating and softening and molding to be bent using a mold while maintaining the softened state. Examples of a molding method include pressure molding, vacuum molding, and heat press molding, and the like, and pressure molding and vacuum molding are preferable.

The cover lens 18 is bonded to the second resin film 24 of the bent laminated conductive sheet 16 through the OCA 50. With this, the touch panel 14 as a three-dimensional body is obtained. The touch panel 14 is bonded to the display device (not shown) through the OCA, thereby obtaining a three-dimensional touch panel-equipped display device.

The invention is not particularly limited to the above-described embodiment, and various alterations can be made without departing from the spirit of the invention.

Figure 11:
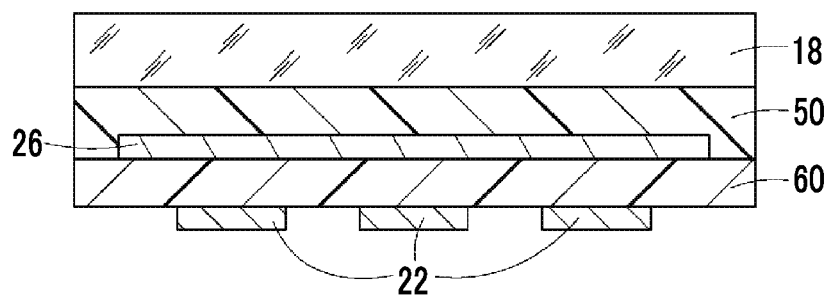
FIG. 11 is a schematic sectional view showing a main part of a capacitive touch panel in which lower detection electrodes are formed on one surface of a resin film and upper detection electrodes are formed on the rear surface of the resin film.

For example, in the embodiment, although the lower detection electrodes 22 are formed on the first resin film 20 and the upper detection electrodes 26 are formed on the second resin film 24, as shown in FIG. 11, the lower detection electrodes 22 may be formed on one surface of a resin film 60 and the upper detection electrodes 26 may be formed on the other surface of the resin film 60. In this case, the surface of the resin film 60 on which the upper detection electrodes 26 are formed and the cover lens 18 may be bonded using the OCA 50.

Figure 12:
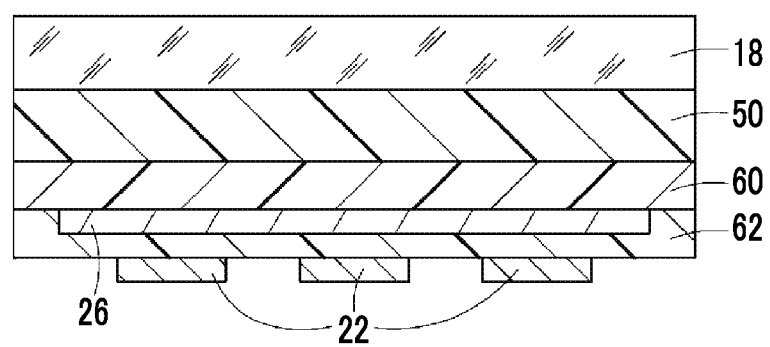
FIG. 12 is a schematic sectional view showing a main part of a capacitive touch panel in which an insulating film is interposed between lower detection electrodes and upper detection electrodes and a resin film on which the upper detection electrodes are formed and a cover lens are bonded.

Alternatively, as shown in FIG. 12, an insulating film 62 may be interposed between the lower detection electrodes 22 and the upper detection electrodes 26, and the resin film 60 on which the upper detection electrodes 26 are formed and the cover lens 18 may be bonded using the OCA 50.

Figure 13:
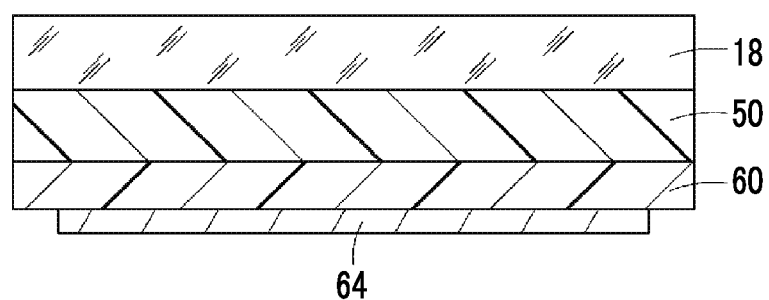
FIG. 13 is a schematic sectional view showing a main part of a capacitive touch panel in which a resin film with detection electrodes formed on one side is bonded to a cover lens.

As shown in FIG. 13, a resin film 60 on which detection electrodes 64 are formed only on one side may be bonded to the cover lens 18 through the OCA 50. In this configuration, an electrode configuration with no intersection portion disclosed in US2012/0262414A is used.

In all cases, bending may be performed such that the detection electrodes are outside the bent portions.

Example 1

Examples 1 and 2 and Comparative Examples 1 to 5

The conductive sheets 10 and 12 for a touch panel were produced according to the following method. The detection electrodes had a rhombic mesh shape made of silver see FIG. 5), the wire width was set to 4 µm, and the cell pitch was set to 200 µm. The terminal wiring portions (peripheral wirings) had a rhombic mesh shape made of silver, the wire width was set to 4 µm, and the cell pitch was set to 20 µm. The connection portions had a rhombic mesh shape made of silver, the wire width was set to 4 µm, and the cell pitch was set to 20 µm.

The detection electrodes, the connection portions, and the terminal wiring portions were formed simultaneously by patterning a silver thin film having a film thickness of 100 nm formed on a PET film having a film thickness of 100 µm using a sputter by a photolithography etching method. The film thickness of each of the detection electrodes, the connection portions, and the terminal wiring portions was 100 nm. The inclination angle of silver wires forming a mesh with respect to the bending lines C1 and C2 was set to 60°. The aperture ratio of the mesh of the detection electrodes at this time was 95.4%.

Thereafter, as shown in FIG. 2, the conductive sheets 10 and 12 for a touch panel were bonded using OCA#8146-2 (film thickness of 50 µm) manufactured by 3M Company, and a laminated conductive sheet was produced. Three-dimensional molding for bending the end portions of the laminated conductive sheet with a radius of curvature of 2.0 mm in the bending lines C1 and C2 such that the detection electrodes and the terminal wiring portion are placed inside was performed by heat press molding. Thereafter, tempered glass having a film thickness of 0.3 mm was bonded onto the laminated conductive sheet using OCA#8146-3 (film thickness of 75 µm) manufactured by 3M Company, and a so-called touch panel having a narrow frame of FIG. 2 was produced. This is referred to as Example 1.

A touch panel was produced from conductive sheets based on Example 1 except that the detection electrodes and the terminal wiring portions were directly electrically connected to each other without providing the connection portions. This is referred to as Example 2.

A touch panel was produced from conductive sheets based on Example 1 except that the terminal wiring portions did not have a mesh shape and had a shape of a single thick wire having a wire width of 30 µm, that is, a so-called solid coat shape. This is referred to as Comparative Example 1.

The detection electrodes made of PEDOT/PSS were formed in a shape of a single thick wire, not a mesh shape. The connection portions and the terminal wiring portions having a mesh shape were formed of PEDOT/PSS. Except for the above, a touch panel was produced from conductive sheets based on Example 1. This is referred to as Comparative Example 2. PEDOT/PSS is known as poly(3,4-ethylene dioxythiophene) (PEDOT) doped with polystyrene sulfonate (PSS).

A touch panel was produced from conductive sheet based on Example 1 except that the detection electrodes were formed of copper having a film thickness of 150 nm. This is referred to as Comparative Example 3. That is, in the touch panel of Comparative Example 3, the detection electrodes are made of copper, and the connection portions and the peripheral wirings are made of silver. In summary, the detection electrodes and the peripheral wirings are made of different metals.

A touch panel was produced from conductive sheet based on Example 1 except that the terminal wiring portions were formed of a silver paste containing a binder, and the film thickness of the terminal wiring portions was 10 µm, and the wire width was 10 µm. This referred to as Comparative Example 4.

In the touch panel of Comparative Example 4, while the detection electrodes and the connection portions are made of pure silver, the peripheral wirings are made of silver containing a binder. In summary, while the principal material of the detection electrodes and the peripheral wirings is silver, the peripheral wirings contain a binder, and from this point, the detection electrodes and the peripheral wiring are not made of the same material. The film thickness of the peripheral wirings is different from that of the detection electrodes and the peripheral wirings.

Both of the detection electrodes and the terminal wiring portions were constituted of a substantially square mesh shown in FIG. 14, and the wire width was set to 10 μm. The wire width of the detection electrodes and the terminal wiring portions was set to 4 μm, and the cell pitch of the detection electrodes was set to 200 μm, and the cell pitch of the terminal wiring portions was set to 20 μm. A touch panel was produced from conductive sheet based on Example 1 except for the above. This is referred to as Comparative Example 5. The aperture ratio of the mesh of the detection electrodes at this time was 96.0%.

In Comparative Example 5, the bending lines C1 and C2 and the silver wires forming the mesh are parallel and perpendicular to each other. That is, the extension direction of the thin silver wires is not inclined with respect to the bending lines C1 and C2.

For the respective touch panels, disconnection fault, the sensitivity of the touch panel, the visibility of the electrodes were evaluated. The results are collectively shown in Table 1. In regard to disconnection fault, a case where disconnection was not observed and electrode resistance was small was evaluated to be "AA", a case where disconnection is not observed and electrode resistance was slightly high but caused no practical problem was evaluated to be "A", a case where disconnection was not observed but electrode resistance is not allowable for practical use was evaluated to be "B", and a case where a lot of disconnection was observed and it was not suitable for practical use was evaluated to be "C". Table 1 also shows a place where disconnection occurs.

In regard to sensitivity, when where an operation (touch) was performed and it was excellent was evaluated to be "AA", when it was good without causing any problem was evaluated to be "A", when sensitivity was allowable for practical use was evaluated to be "B", when sensitivity was not allowable for practical use or there was a place which could not be detected was evaluated to be "C".

In regard to the visibility of the electrodes, an excellent level at which the electrode could not be visually recognized and moire was not observed was evaluated to be "AA", a good level at which the electrodes were visually recognized but moire was not observed was evaluated to be "A", a level at which the electrodes were visually recognized and moire was slightly observed, but there was no practical problem was evaluated to be "B", and a level at which the electrodes were visually recognized and moire exceeds an allowable range was evaluated to be "C".

From Table 1, it is apparent that, if the wire width is equal to or less than 5 μm, both of the detection electrodes and the peripheral wiring have a mesh shape, and the thin conductive metal wires forming the mesh are inclined with respect to the bending lines C1 and C2, a touch panel in which disconnection is not observed, sensitivity is excellent, and visibility is improved is obtained. From Example 2, in a configuration in which the terminal wiring portions are linked (directly connected) to the detection electrode without providing the connection portions, it has been understood that the same effects as in Example 1 are also obtained.

Examples 3 to 6

A conductive sheet was produced based on Example 1 except that a stress distribution portion made of a silver mesh (wire width of 4 μm, pitch of 200 μm, and film thickness of 100 nm) using a sputtered thin silver film having the same mesh shape as the silver mesh constituting the detection electrode was interposed adjacent detection electrodes (see FIG. 8), and a touch panel was produced from the conductive sheet. This is referred to as Example 3.

TABLE 1

| | Pattern | Detection Electrode Shape | Wire Width (μm) | Detection Electrode Material | Peripheral Wiring Shape | Wire Width (μm) | Peripheral Wiring Material | Inclination Angle | Disconnection Fault | Sensitivity | Visibility |
|---|---|---|---|---|---|---|---|---|---|---|---|
| Example 1 | FIG. 5 | Mesh | 4 | Ag (100 nm) | Mesh | 4 | Ag (100 nm) | 60° | AA | A | A |
| Example 2 | FIG. 5 | Mesh | 4 | Ag (100 nm) | Mesh | 4 | Ag (100 nm) | 60° | AA | A | A |
| Comparative Example 1 | FIG. 5 | Mesh | 4 | Ag (100 nm) | Solid | 30 | Ag (100 nm) | 60° | C (Peripheral Wiring) | C | A |
| Comparative Example 2 | | Solid | — | PEDOT/PSS | Mesh | 4 | PEDOT/PSS | 60° | B | C | A |
| Comparative Example 3 | FIG. 5 | Mesh | 4 | Cu (150 nm) | Mesh | 4 | Ag (100 nm) | 60° | C (Connection portion) | C | A |
| Comparative Example 4 | FIG. 5 | Mesh | 4 | Ag (100 nm) | Mesh | 10 | Ag/Binder (10 μm) | 60° | C (Connection Portion) | C | A |
| Comparative Example 5 | FIG. 14 | Mesh | 4 | Ag (100 nm) | Mesh | 4 | Ag (100 nm) | 0°, 90° | C (Bent Portion) | C | C |
| Example 3 | FIG. 8 | Mesh | 4 | Ag (100 nm) | Mesh | 4 | Ag (100 nm) | 60° | AA | AA | AA |
| Example 4 | FIG. 9 | Mesh | 4 | Ag (100 nm) | Mesh | 4 | Ag (100 nm) | 60° | AA | AA | AA |
| Example 5 | FIG. 10 | Mesh | 4 | Ag (100 nm) | Mesh | 4 | Ag (100 nm) | 60° | AA | AA | A |
| Example 6 | | Mesh | 4 | Ag (100 nm) | Mesh | 4 | Ag (100 nm) | 60° | AA | AA | AA |
| Example 7 | FIG. 5 | Mesh | 4 | Ag (100 nm) | Mesh | 4 | Ag (100 nm) | 10° | A | B | B |
| Example 8 | FIG. 5 | Mesh | 4 | Ag (100 nm) | Mesh | 4 | Ag (100 nm) | 22.5° | AA | A | B |
| Example 9 | FIG. 5 | Mesh | 4 | Ag (100 nm) | Mesh | 4 | Ag (100 nm) | 30° | AA | A | A |
| Example 10 | FIG. 5 | Mesh | 4 | Ag (100 nm) | Mesh | 4 | Ag (100 nm) | 37.5° | AA | A | A |
| Example 11 | FIG. 5 | Mesh | 4 | Ag (100 nm) | Mesh | 4 | Ag (100 nm) | 45° | AA | A | B |
| Example 12 | FIG. 5 | Mesh | 4 | Ag (100 nm) | Mesh | 4 | Ag (100 nm) | 52.5° | AA | A | A |
| Example 13 | FIG. 5 | Mesh | 4 | Ag (100 nm) | Mesh | 4 | Ag (100 nm) | 67.5° | AA | A | B |
| Example 14 | FIG. 5 | Mesh | 4 | Ag (100 nm) | Mesh | 4 | Ag (100 nm) | 80° | A | B | B |

In addition to the stress distribution portion interposed between adjacent detection electrodes, a stress distribution portion made of a silver mesh (wire width of 4 μm, pitch of 20 μm, and film thickness of 100 nm) using a sputtered thin silver film having the same mesh shape as the silver mesh constituting the peripheral wirings was interposed between adjacent terminal wiring portions. A conductive sheet shown in FIG. 9 was produced in the same manner as in Example 1 except for the above, and a touch panel was produced from the conductive sheet. This is referred to as Example 4.

A conductive sheet shown in FIG. 10 was produced in the same manner as in Example 1 except that a stress relaxation portion having a width of 2.0 mm was provided inside a detection electrode having an electrode width of 4.0 mm. Thereafter, a touch panel was produced from the conductive sheet. This is referred to as Example 5.

A conductive sheet was produced in the same manner as in Example 4 except that a stress relaxation portion having a width of 2.0 mm in which a thin silver wire was partially disconnected at a width of 15 μm was provided inside a detection electrode having an electrode width of 4.0 mm. Thereafter, a touch panel was produced from the conductive sheet. This is referred to as Example 6.

For the respective touch panels of Examples 3 to 6 described above, disconnection fault, the sensitivity of the touch panel 14, and the visibility of the electrodes were evaluated. The results are collectively shown in Table 1. The specific evaluation details of the evaluation ranks "AA" to "C" relating to disconnection fault, sensitivity, and the visibility of the electrodes are as described above.

From Table 1, in all of Examples 3 to 6, it is understood that a touch panel has no disconnection observed and has excellent sensitivity and visibility. In particular, in Examples 3, 4, and 6, visibility is particularly improved. This is because, in Examples 3, 4, and 6, if the stress distribution portion is interposed, stress is distributed evenly, and thus, the resin film is prevented from being locally extended. In Examples 5 and 6, the stress relaxation portion is provided inside the detection electrodes, whereby stress occurring when the resin film is extended is relaxed. In Examples 3, 4, and 6, since the mesh is present over the entire touch panel, the pattern of the detection electrodes is not recognizable and visibility is excellent.

From the above, it is understood that disconnection is prevented, sensitivity is improved, and the visibility of the electrodes is improved by providing the stress distribution portion or providing the stress relaxation portion inside the detection electrodes.

Examples 7 to 14

A touch panel was produced while changing the inclination angle of the thin silver wires forming the mesh with respect to the bending lines C1 and C2 from 60° in the touch panel of Example 1 to any of 10°, 22.5°, 30°, 37.5°, 45°, 52.5°, 67.5°, or 80°. These are respectively referred to as Examples 7, 8, 9, 10, 11, 12, 13, and 14.

For the respective touch panels of Examples 7 to 14, disconnection fault, the sensitivity of the touch panel, and the visibility of the electrodes were evaluated. The results are collectively shown in Table 1. The specific evaluation details of the evaluation ranks "AA" to "C" relating to disconnection fault, sensitivity, and the visibility of the electrodes are as described above.

From Table 1, in all of Examples 7 to 14, it is understood that a touch panel has no disconnection observed, has sufficient sensitivity, and has visibility causing no problem. In particular, in Examples 8 to 13 in which the inclination angle was in a range of 20° to 70°, as in Example 1, disconnection was not observed, electrode resistance is small and excellent, and the sensitivity of the touch panel is improved. In Examples 9, 10, and 12 in which the inclination angle was in a range of 25° to 40° or 50° to 65°, as in Example 1, visibility was improved.

EXPLANATION OF REFERENCES

10: first conductive sheet for touch panel
12: second conductive sheet for touch panel
14: touch panel
16: laminated conductive sheet
18: cover lens
20: first resin film
22: lower detection electrode
24: second resin film
26: upper detection electrode
28, 28p to 28s: thin conductive metal wire
30: first cell
32: first connection portion
34: first terminal wiring portion
35: first terminal portion
36: second terminal wiring portion
38: second cell
40: third cell
42: second connection portion
44: right second terminal portion
46: left second terminal portion
48: fourth cell
50: optical adhesive layer (OCA)
52, 54: stress distribution portion
56: stress relaxation portion
60: resin film
62: insulating film
64: detection electrode

What is claimed is:

1. A conductive sheet for a touch panel comprising:
a resin film on which a plurality of detection electrodes disposed in a detection region and a plurality of peripheral wirings disposed in a peripheral wiring region to electrically connect the detection electrodes to terminal portions are formed, the resin film having a three-dimensional shape having a bent portion,
wherein each of the detection electrodes is made of a mesh-patterned first metal mesh having intersecting thin conductive metal wires,
each of the peripheral wirings is made of a mesh-patterned second metal mesh having intersecting thin conductive metal wires made of the same material as the thin conductive metal wires constituting each of the detection electrodes, and
the wire width of the first metal mesh is equal to or less than 5 μm, and the extension direction of the thin conductive metal wires constituting the first metal mesh and the second metal mesh is inclined at an angle of 20° to 70° with respect to a bending line direction of the bent portion of the resin film.

2. The conductive sheet for a touch panel according to claim 1,
wherein the resin film has the bent portion in a region including at least one of the detection electrode or the peripheral wirings.

3. The conductive sheet for a touch panel according to claim 1, wherein an average mesh pitch of the second metal mesh is smaller than an average mesh pitch of the first metal mesh.

4. The conductive sheet for a touch panel according to claim 2,
wherein an average mesh pitch of the second metal mesh is smaller than an average mesh pitch of the first metal mesh.

5. The conductive sheet for a touch panel according to claim 3,
wherein the average mesh pitch of the second metal mesh is 10 to 50 μm.

6. The conductive sheet for a touch panel according to claim 4,
wherein the average mesh pitch of the second metal mesh is 10 to 50 μm.

7. The conductive sheet for a touch panel according to claim 1,
wherein the wire width of the first metal mesh is equal to the wire width of the second metal mesh.

8. The conductive sheet for a touch panel according to claim 2,
wherein the wire width of the first metal mesh is equal to the wire width of the second metal mesh.

9. The conductive sheet for a touch panel according to claim 3,
wherein the wire width of the first metal mesh is equal to the wire width of the second metal mesh.

10. The conductive sheet for a touch panel according to claim 4,
wherein the wire width of the first metal mesh is equal to the wire width of the second metal mesh.

11. The conductive sheet for a touch panel according to claim 1,
wherein a first stress distribution portion which is insulated from both of the detection electrodes and the peripheral wirings and has the same surface density as that of the first metal mesh is provided between at least adjacent detection electrodes in the detection region.

12. The conductive sheet for a touch panel according to claim 11,
wherein the first stress distribution portion has intersecting thin conductive metal wires made of the same material as the thin conductive metal wires constituting each of the detection electrodes, and is made of a metal mesh having the same mesh shape as that of the first metal mesh.

13. The conductive sheet for a touch panel according to claim 11,
wherein a second stress distribution portion which is insulated from both the detection electrodes and the peripheral wirings and has the same surface density as that of the second metal mesh is provided between at least adjacent peripheral wirings in the peripheral wiring region.

14. The conductive sheet for a touch panel according to claim 13,
wherein the second stress distribution portion has intersecting thin conductive metal wires made of the same material as the thin conductive metal wires constituting each of the peripheral wirings, and is made of a metal mesh having the same mesh shape as that of the second metal mesh.

15. The conductive sheet for a touch panel according to claim 1,
wherein a stress relaxation portion in which the thin conductive metal wires constituting each of the detection electrodes are disconnected is formed inside at least one of the detection electrodes.

16. The conductive sheet for a touch panel according to claim 15,
wherein the stress relaxation portion is formed by partially disconnecting the thin conductive metal wires constituting each of the detection electrodes.

17. The conductive sheet for a touch panel according to claim 1,
wherein the shape of the first metal mesh is a random pattern.

18. The conductive sheet for a touch panel according to claim 1,
wherein the shape of the second metal mesh is a regular pattern.

19. The conductive sheet for a touch panel according to claim 1,
wherein the resin film is bent with a surface, on which the detection electrodes and the peripheral wirings are formed, placed inside to have a three-dimensional shape.

20. A capacitive touch panel comprising:
the conductive sheet for touch panel according to claim 1.

* * * * *